United States Patent
Jabusch et al.

(10) Patent No.: US 9,969,353 B2
(45) Date of Patent: *May 15, 2018

(54) FORCE-LIMITING DEVICE FOR A SEAT BELT SYSTEM

(71) Applicant: Autoliv Development AB, Vårgårda (SE)

(72) Inventors: Ronald Jabusch, Elmshorn (DE); Klaus-Peter Singer, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/029,724

(22) PCT Filed: Oct. 13, 2014

(86) PCT No.: PCT/EP2014/071867
§ 371 (c)(1),
(2) Date: Apr. 15, 2016

(87) PCT Pub. No.: WO2015/055570
PCT Pub. Date: Apr. 23, 2015

(65) Prior Publication Data
US 2016/0229375 A1    Aug. 11, 2016

(30) Foreign Application Priority Data

Oct. 16, 2013    (DE) .................. 10 2013 220 949

(51) Int. Cl.
*B60R 22/38*    (2006.01)
*B60R 22/46*    (2006.01)
*B60R 22/34*    (2006.01)

(52) U.S. Cl.
CPC ...... *B60R 22/4671* (2013.01); *B60R 22/3413* (2013.01); *B60R 22/38* (2013.01)

(58) Field of Classification Search
CPC ..... B60R 22/34; B60R 22/38; B60R 22/3413; B60R 22/4671
See application file for complete search history.

(56) References Cited

U.S. PATENT DOCUMENTS

| 3,442,466 A | 5/1969 | Fritsche |
| 4,206,887 A | 6/1980 | de Rosa |

(Continued)

FOREIGN PATENT DOCUMENTS

| DE | 296 14 587 U1 | 2/1997 |
| DE | 201 10 423 U1 | 11/2001 |

(Continued)

OTHER PUBLICATIONS

PCT International Search Report—Oct. 13, 2014.
(Continued)

*Primary Examiner* — Sang K Kim
(74) *Attorney, Agent, or Firm* — Brinks Gilson & Lione

(57) ABSTRACT

A force-limiting device (4) for a seat belt device having at least two parts (5, 11, 15) controlled with a frequency-dependent, defined movement for energy absorption, wherein the parts (5, 11, 15) that move the parts (5, 11, 15) undergo an undulating movement (Q) directed perpendicular to the feed movement (V) in the course of which the gearings (8, 10, 18, 19) alternatingly engage and disengage. An open spring washer exerts force to move the parts (5, 11, 15) toward one another and can be automatically increased after a preset belt extraction length. The spring washer (6) applies a varying spring force to the parts (5, 11, 15) moving toward one another during the movement.

12 Claims, 4 Drawing Sheets

(56) References Cited

U.S. PATENT DOCUMENTS

| | | | |
|---|---|---|---|
| 4,323,205 A | 4/1982 | Tsuge et al. | |
| 4,483,494 A | 11/1984 | Takada | |
| 4,749,142 A | 6/1988 | Saitow | |
| 4,943,011 A | 7/1990 | Kitamura | |
| 5,601,251 A | 2/1997 | Hishon et al. | |
| 5,636,806 A | 6/1997 | Sayles | |
| 5,769,345 A | 6/1998 | Morner et al. | |
| 6,098,722 A | 8/2000 | Karl-Ludwig Kimmig et al. | |
| 6,260,781 B1 | 7/2001 | Smithson et al. | |
| 6,260,782 B1 | 7/2001 | Smithson et al. | |
| 6,871,813 B2 | 3/2005 | Bae | |
| 7,210,645 B2 | 5/2007 | Paterson et al. | |
| 7,631,830 B2 | 12/2009 | Boelstler et al. | |
| 7,980,503 B2 | 7/2011 | Saito et al. | |
| 8,473,162 B2 | 6/2013 | Jabusch | |
| 8,529,398 B2 | 9/2013 | Jabusch | |
| 2002/0050542 A1 | 5/2002 | Nagata et al. | |
| 2002/0190515 A1 | 12/2002 | Birk et al. | |
| 2005/0059524 A1 | 3/2005 | Hori et al. | |
| 2005/0133330 A1 | 6/2005 | Stiefvater | |
| 2006/0208126 A1 | 9/2006 | Hiramatsu | |
| 2008/0105778 A1 | 5/2008 | Benner | |
| 2008/0191083 A1 | 8/2008 | Sumiyashiki | |
| 2011/0172054 A1* | 7/2011 | Jabusch | B60R 19/36 475/331 |

FOREIGN PATENT DOCUMENTS

| | | |
|---|---|---|
| DE | 202 07 276 | 10/2002 |
| DE | 202 09 965 U1 | 10/2002 |
| DE | 10 2005 016 822 B3 | 1/2007 |
| DE | 10 2006 003 353 A1 | 7/2007 |
| DE | 10 2008 010 431 A1 | 9/2009 |
| DE | 10/2008/049 931 A1 | 5/2010 |
| DE | 10 2008 049 931 A1 | 5/2010 |
| DE | 10 2009 010 435 A1 | 9/2010 |
| DE | 10 2009 024 292 A1 | 12/2010 |
| DE | 10 2010 050 189 A1 | 5/2012 |
| DE | 10 2011 008 405 A1 | 7/2012 |
| DE | 10 2011 101515 A1 | 11/2012 |
| EP | 1 069 009 A1 | 1/2001 |
| EP | 1 222 097 B1 | 2/2004 |
| FR | 2 528 928 | 6/1982 |
| WO | WO 96/32303 | 10/1996 |
| WO | WO 2003/020557 A1 | 3/2003 |
| WO | WO 2004 096611 A1 | 11/2004 |
| WO | WO 2006/108451 A1 | 10/2006 |
| WO | WO 2006/198451 A1 | 10/2006 |
| WO | WO/2007/130041 A1 | 11/2007 |
| WO | WO 2010/037460 A2 | 4/2010 |
| WO | WO 2010/139433 A1 | 12/2010 |

OTHER PUBLICATIONS

German Examination Report—May 19, 2014.
PCT International Search Report and Written Opinion of PCT/EP2014/071867 dated Dec. 15, 2014 (English Translation).
PCT International Search Report of PCT/EP2013/002307 dated Oct. 17, 2013 (English Translation).

* cited by examiner

FORCE-LIMITING DEVICE FOR A SEAT BELT SYSTEM

CROSS REFERENCE TO RELATED APPLICATIONS

This application claims priority to German Patent Application No. 10 2013 220 949.5, filed Oct. 16, 2013 and PCT International Application No. PCT/EP2014/071867, filed on Oct. 13, 2014.

FIELD OF THE INVENTION

The invention relates to a force-limiting device for a safety belt system.

BACKGROUND

Known from WO 2006/108451 A1 is, for example, a speed-controlled force-limiting device for a seat belt retractor which has a plurality of masses disposed on the frame of the belt retractor that are made to oscillate. The masses are pivotably supported on the retractor frame and engage alternately, during the force-limiting retracting of the seat belt, with two teeth in an annular gear connected to the belt shaft. On the whole, due to the oscillating masses disposed on the retractor frame, the belt retractor is complex in production and expensive. In addition, due to the oscillating masses the belt retractor requires a relatively large installation space.

German patent application DE 10 2008 049 931.5 describes an improved force-limiting device operating on the same principle, wherein two toothed parts are moved in a force-limited manner toward each other, and one of the parts here executes an undulating feed motion during which the toothed parts alternatingly engage and disengage. The oscillating masses are replaced in this embodiment by the part executing the undulating feed movement, so that the force-limiting device described here requires a substantially smaller installation space and has a substantially simpler design. In one exemplary embodiment the part executing the undulating feed movement is realized by a toothed disc which is connectable in a friction-fit manner to the belt shaft. Between the toothed disc and the part against which the toothed disc executes the feed movement, a spring washer can be provided which exerts an axial contact force on the toothed disc, whereby the force-limiting level of the force-limiting characteristic is increased.

The force-limiting level of the force-limiting device results automatically from the to-be-diminished kinetic energy of the occupant during forward displacement, wherein the basic characteristic of the force-limiting path is strictly determined by the parameters of the toothed disc, such as the number of teeth, the separation of the teeth, the mass of the toothed disc and by the spring properties of the spring washer.

There are legal requirements, however, such as the US requirements for restraining forces for passengers in the back seats, which mandate an increase of the restraining forces to a higher force-limiting level after a preset length of seat-belt extraction. Such a force-limiting characteristic is not achievable with one of the above-described force-limiting devices.

In the patent application DE 10 2012 214 521, features are provided to resolve this problem using which the force required to move the parts toward one other can be automatically increased when a preset length of seat-belt extraction is reached. According to one embodiment of the proposed solution these means are formed by an open spring washer which applies a variable spring force to the parts moving toward one other during movement. In addition, during the movement the open ends of the spring washer come into abutment with the stop surfaces of the parts moving toward one another. Using the proposed solution, the spring washer is widened after the abutment of the ends on the stop surfaces, and the undulating shape of the spring washer is enhanced, so that as a result an increased spring force is applied to the two parts that are being moved toward one another, and the force-limiting level increases.

The object of the invention is to create a force-limiting device of the above-mentioned type which makes possible a progressive force-limiting course of the restraining forces, which can be constructed simply and has greater functional security.

In order to achieve this object, the invention proposes a force-limiting device having the features described herein by the Figures, and the accompanying description.

SUMMARY

According to the basic idea of the invention, it is proposed that means are provided, using which the force required to move the parts toward one another, from a preset length of belt extraction on, can be automatically increased, and that the means are formed by an open spring washer that applies a varying spring force to the parts that are moving toward one another during movement, wherein one of the parts is displaceably supported on a hub perpendicular to the feed direction, and that on one of the parts a first stop surface, and on the hub a second stop surface is provided, with which the open end of the spring washer comes into contact during the movement. The advantage of the proposed solution is that the force-limiting level of the force-limiting characteristic is automatically increased solely due to the movement from a preset length of belt extraction on. This exploits the advantage that the force-limiting level of the force-limiting device can be varied simply by the force of the parts moving toward one another, because this force is one of the key parameters for the energy dissipation on which the force-limiting device is based. In this way, the parts themselves do not have to be modified in order to change the oscillatory behavior and the force-limiting level. It is particularly important here that the force is variable from a preset length of belt extraction on, so that external actuation is not required. Furthermore, the force is increased by very simple mechanical means, namely an open spring washer whose open ends, from a preset length of belt extraction on, come into contact with stop surfaces and are in this way widened and deformed, so that the spring force of the parts being moved toward one another automatically increases. Because the end assigned to the part that performs the oscillatory movement perpendicular to the feed movement can now be fixed to a hub that serves as a mount for the transversely displaceable part, this end intentionally no longer takes part in performing the perpendicular oscillatory movement. On the contrary, the part that executes the perpendicular oscillatory movement can in this way also carry out a movement relative to the end that is fixed to the hub, so that the spring washer, excluding the middle area, is periodically compressed and decompressed, whereas the ends do not perform any movement perpendicular to the feed movement and are thus not at risk of slipping off one of the stop surfaces. In this way, the functional safety of the force-limiting device can be significantly improved.

It is further proposed that the hub be formed by an annular gear that is attached to a belt shaft of a belt retractor for conjoint rotation with the belt shaft, or by an annular gear with external teeth that is indirectly or directly blockable for conjoint rotation with a retractor frame of the belt retractor, on which hub one of the two parts that are moved toward one another is supported in a transversely displaceable manner. The annular gear serves the purpose of fixing or carrying along one of the parts that are moved toward one another and thus performs the same relative feed movement in the circumferential direction of the respective other part of the force-limiting device, while the ring, at the same time, serves the purpose of bearing the part that performs the oscillating movement directed perpendicular to the feed direction so that the ring does not also perform this movement. In practical terms, the annular gear forms the shift point at which the feed movement in the circumferential direction and the transversely directed oscillation movement are decoupled from each other. Then in addition, due to the formation of the stop surface on the annular gear, only the feed movement in the circumferential direction is transferred to the end of the annular gear, which leads to the desired increase in spring force, whereas the perpendicular movement that causes the spring end to slip off is intentionally not transferred.

It is further proposed that the second stop surface is provided in a recess and/or on a projecting tooth of the external teeth of the annular gear. Using the proposed solution the external teeth can also be favorably exploited during the production process to form the stop surface, by some of the teeth being left out and/or one of the teeth being extended outward.

Furthermore, according to a further preferred embodiment of the invention, a cutout is provided in the part that is transversely displaceable on the hub, the end of the annular gear that comes to rest against the second stop surface of the hub engaging into said cutout. Using the proposed solution, the part that is transversely displaceable on the hub can perform the movement relative to the hub without the movement being hindered by the fixed end.

It is further proposed that the ends of the spring washer are angled in the direction of the parts that are moving toward one another, and that in one of the parts and in the hub, pockets are provided respectively, wherein the stop surfaces are provided, and that the ends of the spring washer, after a preset length of belt extraction, are automatically stopped by the stop surfaces in the pockets. The advantage of the proposed solution is that the ends of the spring washer, after a preset length of belt extraction, due to their form and the spring properties of the spring washer, automatically slide into the pockets and come to rest against the stop surfaces. The pockets are expediently shaped as identical in form to the angled ends, so that in them, the ends come into contact with largest possible circumferential surface and are supported as well as possible during further movement. The pockets, corresponding to the outwardly angled ends, are designed as slanted recesses, so that the angled ends, corresponding to their form, are accommodated in the pockets, and the spring washer, in its region between the ends, again has a flat course and fits over as large an area as possible against the two parts that are moved toward one another.

It is further proposed that one end of the spring washer be firmly connected to one of the parts in the direction of movement of the parts that are moving toward one another, and that it have a spiral course starting from one end. Due to the rigidly held end and the spiral course of the spring washer, the spring washer can be coiled during the movement into several windings resting on each other, wherein the spring force exerted to the side, e.g. by the reinforcement of the undulation or by a side bulge of the windings, is increased.

In addition it is recommended that a spiral guide track be provided into which the spring washer can be inserted. In another preferred embodiment, said guide track is formed by a groove. Using the spiral guide track, the course of the spring washer into which the latter is transported is in practice preset. This ensures that movement in an uncontrolled manner is impeded by a clamping of the spring washer, causing the force-limiting level to be undesirably increased to too high a level. To that end a groove, in particular, is suitable, since the spring washer can be guided therein especially well and continuously.

The groove here can feature a decreasing depth in the direction of movement of the open end so that the compression force exerted by the spring washer between the two parts and thus the force-limiting level can also be increased with an increasing belt extraction length.

BRIEF DESCRIPTION OF THE DRAWINGS

The invention will be explained below using a preferred embodiment with reference to the accompanying Figures.

DETAILED DESCRIPTION

Figure 1:
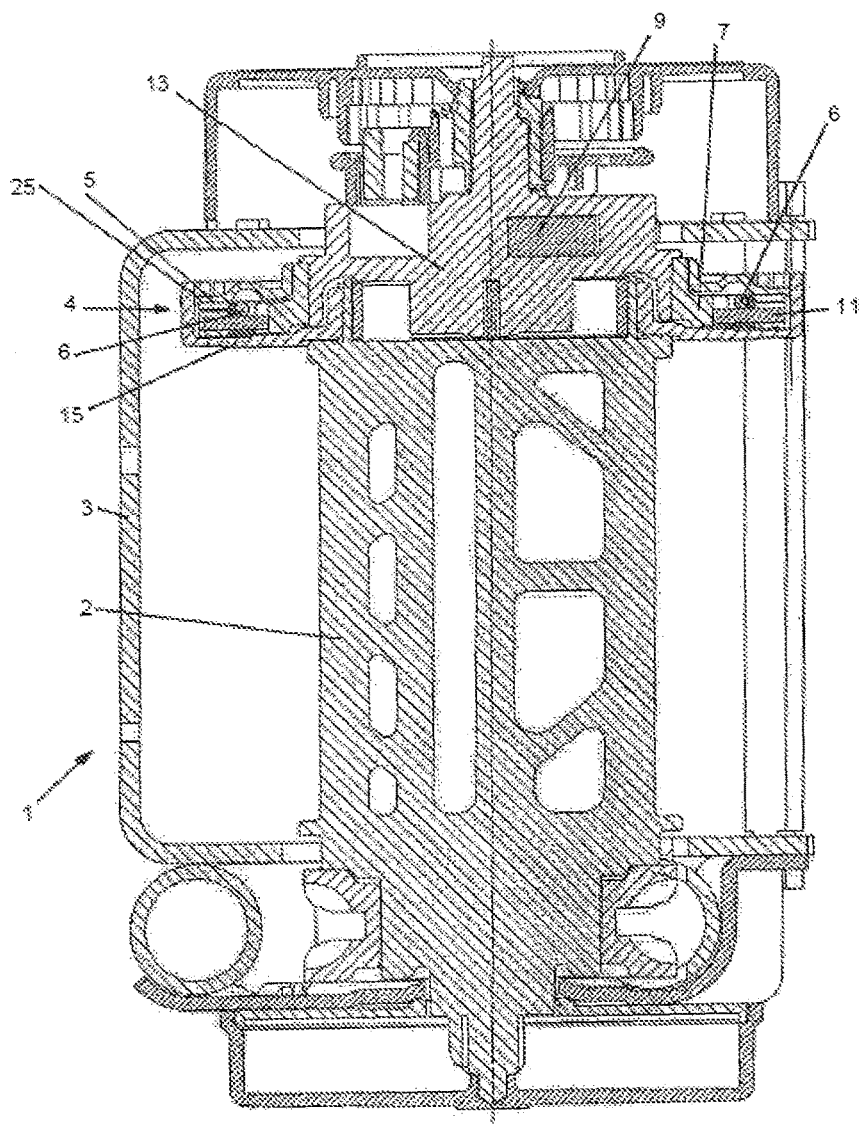
FIG. 1 shows a belt retractor with an inventive force-limiting device.

FIG. 1 shows a belt retractor 1 of a seat belt system with a belt shaft 2 rotatably supported in a retractor frame 3, on which frame 3 a force-limiting device 4 is disposed. In addition a profile head 13 is provided, which is the carrier of a locking ratchet 9 that is actuated when a preset belt extraction acceleration or a preset vehicle deceleration is exceeded and locks the profile head 13 firmly to the vehicle in a gearing of the retractor frame 3.

Figure 3:
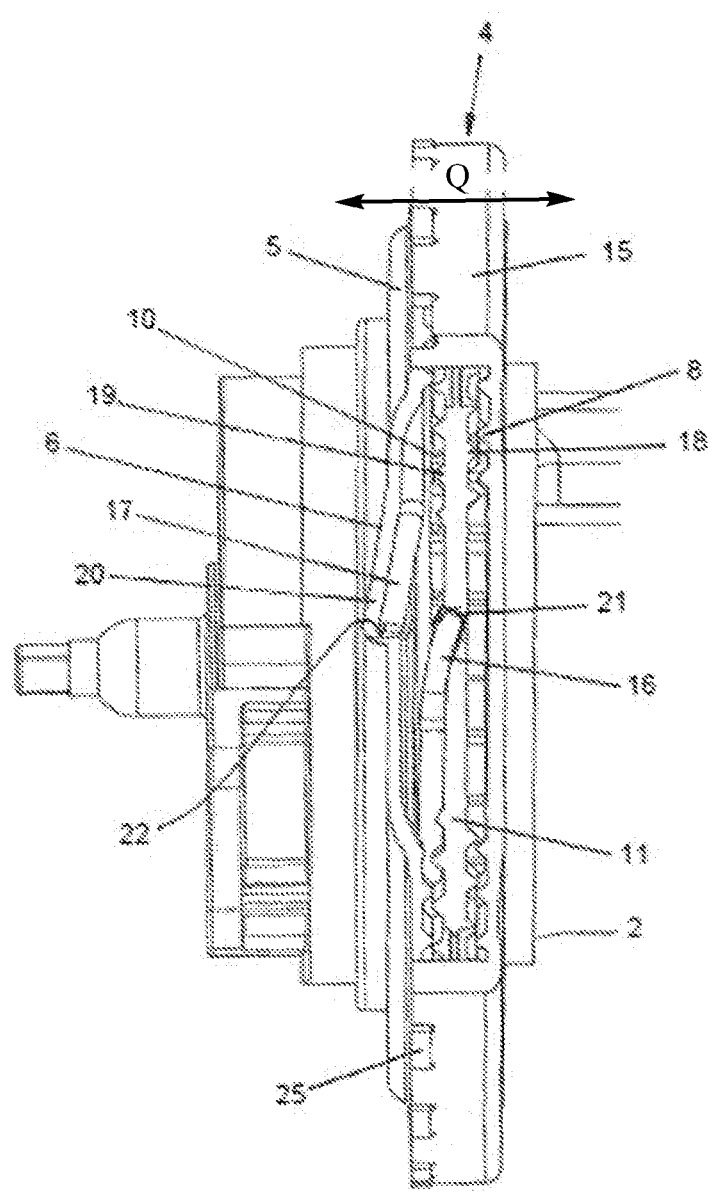
FIG. 3 shows a side view of a cutaway force-limiting device.

The force-limiting device 4 includes in its basic construction two fixed parts 5 and 15 with a movable part 11 between the fixed parts 5 and 15. The part 15 simultaneously forms the housing of the force-limiting device 4 and is connected to the belt shaft 2 for conjoint rotation therewith. On its radial exterior, the part 15 has axially aligned fingers between which the part 5 engages with radially protruding fingers 25 and thus is also connected to part 15 for conjoint rotation therewith and thus also to the belt shaft 2. The movable part 11 is guided with a radially inward gearing 26 in an axially displaceable manner on an annular gear 7 and is simultaneously connected in the circumferential direction to the annular gear 7 for conjoint rotation therewith. The annular gear 7 is in turn connected to the profile head 13 for conjoint rotation therewith, so that the part 11 with a blocked profile head 13 is to be viewed as also blocked in the circumferential direction. The fixed parts 5 and 15 are respectively provided with annular, axially aligned gearings 10 and 8, as can be seen in FIG. 3. The gearing 10 on part 5 and the gearing 8 on part 15 are each positioned such that they are opposite the ring-shaped, axially aligned gearing 18 or 19 positioned on the movable part 11. The separation between the movable part 11 and the fixed parts 5 and 15 in the axial direction is selected in each case such that at least one pair of opposite gearings 10 and 19 and/or 18 and 8 are engaged.

Figure 2:
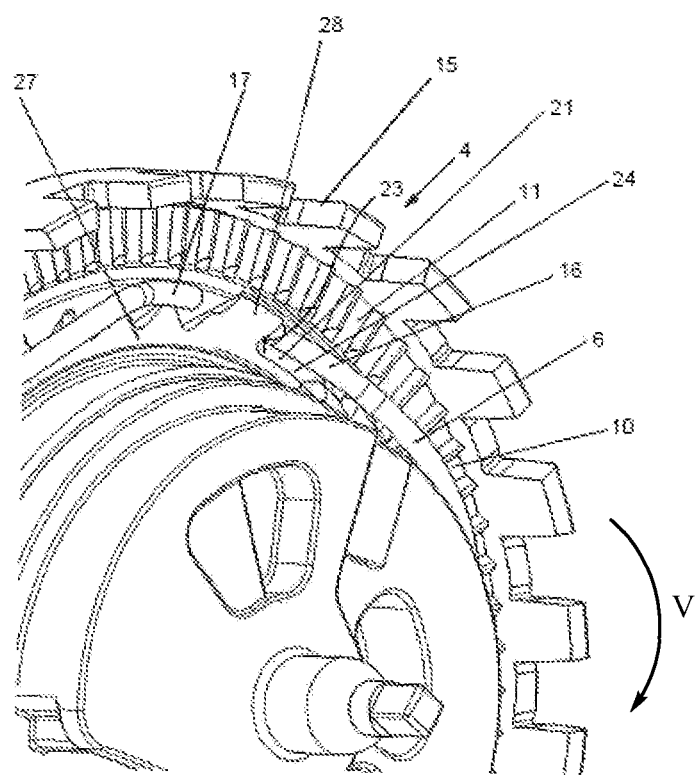
FIG. 2 shows an oblique view of a belt shaft with a cutaway force-limiting device.

Upon actuation of the blocking device of the belt shaft 2, the locking ratchet 9 is extended and blocks the profile head 13 and thus the part 11 in the belt extraction direction. The force-limiting device 4 is activated by the belt extraction force acting in an accident during forward displacement of the passenger when the belt extraction force preset by the design of the force-limiting device 4 itself is exceeded. In the process, parts 15 and 5 are forced into a rotary movement, designated by arrow V, as shown in FIG. 2, with respect to part 11. Because of the pair-wise engagement of gearings 10 and 19 and 18 and 8 with each other, the part 11 is forced by the teeth flanks gliding past each other into an axial oscillatory movement, designated by arrow Q, as shown in FIG. 3, perpendicular to the feed movement of parts 15 and 5, during which it is periodically braked and accelerated. This oscillatory movement is the physical cause for the energy dissipation underlying the force-limiting device 4, which thus also determines the force-limiting level. The part 11 can also be termed an oscillating disc based on its motion by means of its oscillatory motion it ensures the feed movement V of parts 5 and 15 and thus the force-limited rotary motion of the belt shaft 2 in the belt extraction direction.

Between part 11 and part 5, an open undulating spring washer 6 is provided, which is supported on part 5 and pushes part 11 against part 15. Since part 11 must periodically overcome the axial spring force exerted by the spring washer 6 in order to perform the above-described oscillatory motion, the force-limiting level of the force-limiting device 4 is determined in the start phase and during the additional belt extraction movement by the spring force of the spring washer 6. For example, the belt extraction force in the start phase can be 3-4 kN.

FIG. 2 shows the belt shaft 2 with a cutaway force-limiting device 4. The spring washer 6 is open and its free ends 16 and 17 are angled to the side, so that the free ends 16 and 17 exert an additional axial force between parts 5 and 11, or as the case may be lie spring-tensioned against the parts 5 and 11. In the initial position before actuation of the force-limiting device 4, the ends 16 and 17 are located in the direction of rotation behind a pocket 20 and 21 respectively of the annular gear 7 and the part 5. The pockets 20 and 21 are respectively formed as inclined recesses, which can also be seen in FIG. 3. Upon activation of the force-limiting device 4, the parts 15 and 5 together, with the belt shaft 2, rotate with respect to part 11, which is blocked in the circumferential direction, and the profile head 13. The force-limiting level is determined in this phase by the mass design of the system and the spring force of the spring washer 6. During the rotary motion of parts 15 and 5, the spring washer 6 is stationary relative to them, except for the transversely directed oscillating movement.

After the belt shaft 2 with parts 15 and 5 has been rotated almost one full rotation, in this case a rotation of 340 degrees, with respect to part 11 and thus with respect to the spring washer 6, the end 17 slides automatically into the pocket 20 because of its outward bend, its front surface thereby coming to rest against a stop surface 22 provided in the pocket 20 of part 5. During the continuing rotation of part 5 the spring washer 6 is carried along with it via the stop surface 22, so that the end 16 completes a rotary motion with respect to part 11 and the annular gear 7. During this movement the force-limiting level of the start phase continues to act. The end 16 then also slides, after completion of almost one complete rotation, in this case also 340 degrees, because of its concave shape, through a cutout 24 in the part 11 into the pocket 21 and is also stopped against a frontal stop surface 23 of the annular gear 7, as can be seen in the depiction in FIG. 3. Starting at this position, the spring washer 6 is fixed in the circumferential direction with respect to both part 5 and to part 11, so that an additional rotary motion of part 5 with respect to part 11 and thus also of the belt shaft 2 with respect to the profile head 13 is only possible by a deformation of the spring washer 6. The spring washer 6 thereby rises and increases the axial spring force between the part 5 and the part 11, so that the force-limiting level abruptly rises, in this case to above 6 kN. Thus with the invention using a force-limiting device 4, a progressive force-limiting course can be implemented with a shift point defined by the location of the pockets 20 and 21 with respect to the free ends 16 and 17 and the rotational angle consequently to be covered, which shift point in this embodiment corresponds to 680 degrees or about 1.9 revolutions. Depending on the mechanical characteristics, the shape and the arrangement of the spring washer, both the characteristics of the force-limiting increase, as well as the extent of the force-limiting increase, can be regulated. Both continuous and abrupt increases of the force-limiting level are thereby possible.

Corresponding to the inventive approach, the pocket 21 is intentionally arranged in the annular gear 7 relative to which the part 11 performs the oscillation movement that is directed perpendicular to the feed direction. The end 16 of the spring washer 6 engages into the cutout 24, so that the part 11, in this case the oscillating disc, can perform the oscillation movement directed perpendicular to the annular gear 7 without being hindered in doing so by the spring washer 7. The ends 16 and 17 are thus moved in a purely rotary motion relative to each other, because they also perform the feed movement only in the circumferential direction. In this way the likelihood that the ends 16 and 17 can slip out of the pockets 20 and 21 is diminished. The pocket 21 on the annular gear 17 is formed by leaving out one or more teeth in the external gearing of the annular gear 7 and by outward enlargement of one tooth 28, the outwardly enlarged tooth 28 here forming a lateral stop surface 23, against which the end 16 of the spring washer 6 comes to rest on the face side.

Figure 4:
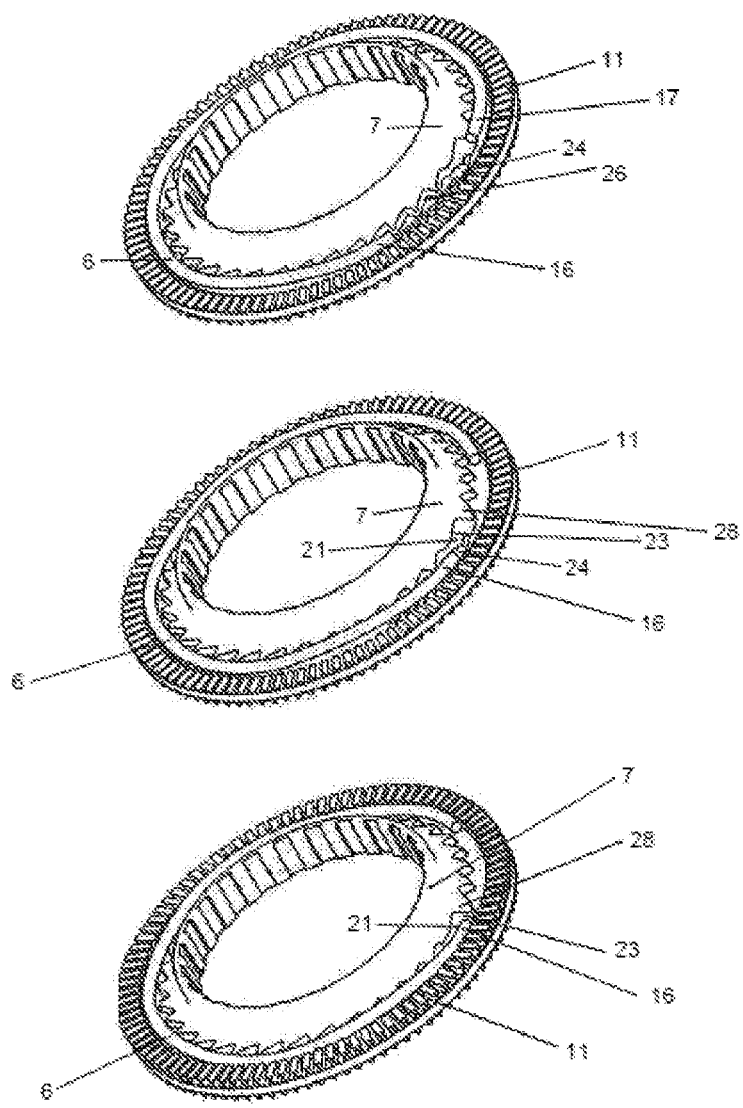
FIG. 4 shows an annular gear with an oscillating disc deposed on it.

FIG. 4 shows the annular gear 7 with the part 11 and the laterally stopped spring washer 6. In part 11, the oscillating disc can be seen in a radial inner section, the cutout 24, which is formed by punching. In addition, a plurality of the teeth in the external gearing have been left out or shortened, and one tooth 28 has been lengthened. In this case, the omission of the teeth forms the pocket 21, which is delimited by the enlarged tooth 28 on which the stop surface 23 is also provided.

The part 11 is supported in a transversely displaceable manner on an external gearing of the annular gear 7 and is rotationally fixed in the circumferential direction so that the part 11, with a blocking of the profile head 13 and the annular ring 7, can only oscillate perpendicular to the annular gear 7. The spring washer 6, as described above, after the end 17 is fixed to the part 5, is carried along in the circumferential direction, so that the end 16 of the spring washer 6 is moved in the direction of the pocket 21. Because the end 16 is angled in the direction of the part 11 and is thus held spring-tensioned against part 11, the end 16, when it reaches the cutout 24, automatically slides through the cutout 24 into the pocket 21 and in that way, during the further movement, is held on its front side against the stop surface 23 or the tooth 28. Then a further movement of the belt shaft 2 with the parts 5 and 15 relative to the part 11 and the annular ring 7, or as the case may be the profile head 13, is only possible with a deformation of the spring washer, whereupon the spring force it exerts between the parts 11 and 5 increases.

While the above description constitutes the preferred embodiment of the present invention, it will be appreciated that the invention is susceptible to modification, variation and change without departing from the proper scope and fair meaning of the accompanying claims.

The invention claimed is:

1. A force-limiting device for a seat belt device comprising, at least first and second parts controlled with a frequency-dependent defined movement, wherein the first and second parts moving relative to one another have respective first and second gearings engaging into one other, and the frequency-dependent defined movement occurs such that the first and second parts execute a rotary feed movement with respect to one another and an axial undulating movement perpendicular to the feed movement, the axial undulating movement causing the gearings to alternatingly engage and disengage, an open spring washer exerting a spring force for movement of the first and second parts toward one another which force is increased after a preset seat belt extraction length, the open spring washer acts with a changing spring force on the first and second parts moving toward one another during the defined movement, wherein one of the first and second parts is displaceably supported on a hub perpendicular to the rotary feed movement, and on the first part, a first stop surface is provided, and on the second part, a second stop surface is provided, and first and second open ends of the spring washer come to rest against the first and second stop surfaces during the defined movement.

2. The force-limiting device according to claim 1, further comprising;
the hub is formed by an annular gear connected to a belt shaft, for rotation therewith of a belt retractor of the seat-belt device, or formed by a directly or indirectly lockable annular ring with external gearing, the hub being rotationally fixed in relation to a retractor frame of the belt retractor, and on which hub one of the first and second parts that are moved toward one another is deposed in an axially relocatable manner.

3. The force-limiting device according to claim 2, further comprising,
the second stop surface is provided in a recess or on a projecting tooth of the external gearing of the annular ring.

4. The force-limiting device according to claim 1, further comprising,
on the hub, a cutout is provided, into which one of the first and second open ends of the spring washer that comes to rest against the second stop surface of the hub engages.

5. The force-limiting device according to claim 1, further comprising that the first and the second open ends of the spring washer are angled in the direction of the first and the second parts that move toward one another, and that in one of the first and second parts and in the hub respectively, pockets are provided, wherein the first and the second stop surfaces are provided, and that the first and second open ends of the spring washer, after the preset belt-retraction length, come into contact with the stop surfaces in the pockets.

6. The force-limiting device according to claim 1, further comprising that one of the first and the second open ends of the spring washer, in the direction of movement of the first and second parts that move toward each another is fixedly connected to one of the first and the second parts, and that the spring washer has a spiral course starting from one of the first and the second ends.

7. The force-limiting device according to claim 6, further comprising a spiral guide track is provided, into which the spring washer is inserted.

8. The force-limiting device according to claim 7, further comprising the guide track is formed by a groove.

9. The force-limiting device according to claim 8, further comprising in that the groove has a decreasing depth in the direction of movement of one of the first and the second open ends of the spring washer.

10. The force-limiting device according to claim 1, further comprising, wherein the first and the second ends engage with the first and the second stop surfaces when a predetermined angular displacement occurs between the first and the second parts, the predetermined angular displacement being related to the preset seat belt extraction length.

11. The force-limiting device according to claim 10, further comprising wherein during the rotary feed movement between the first and the second parts before the predetermined angular displacement is reached, at least one of the first and the second ends of the open spring washer move relative to one of the first and the second parts.

12. The force-limiting device according to claim 1, further comprising, wherein when the first and the second ends of the open spring washer engage with the first and the second stop surfaces, further relative rotation between the first and the second parts causes deformation of the open spring washer, thereby exerting an increase in the spring force and increasing the spring force after the preset seat belt extraction length.

* * * * *